(12) United States Patent
Lloyd

(10) Patent No.: US 9,187,197 B2
(45) Date of Patent: Nov. 17, 2015

(54) THERMOPLASTIC ELASTOMERIC ATTACHMENT SYSTEM FOR TRANSFER OF PARTICULATE MATERIALS

(75) Inventor: Steve M. Lloyd, Smyrna, DE (US)

(73) Assignee: ILC DOVER IP, INC., Frederica, DE (US)

( * ) Notice: Subject to any disclaimer, the term of this patent is extended or adjusted under 35 U.S.C. 154(b) by 773 days.

(21) Appl. No.: 12/748,286

(22) Filed: Mar. 26, 2010

(65) Prior Publication Data

US 2010/0253071 A1 Oct. 7, 2010

Related U.S. Application Data

(60) Provisional application No. 61/163,536, filed on Mar. 26, 2009.

(51) Int. Cl.
*B65B 39/00* (2006.01)
*B65B 1/28* (2006.01)
*B65G 69/18* (2006.01)

(52) U.S. Cl.
CPC ................ *B65B 39/007* (2013.01); *B65B 1/28* (2013.01); *B65G 69/181* (2013.01)

(58) Field of Classification Search
CPC ........................ Y10T 103/7073; Y10T 403/62
USPC ......... 285/903, 408, 405, 398, 397, 970, 369, 285/148.23, 148.18; 220/495.01; 193/25 C; 141/65, 10; 403/341, 345, 377
See application file for complete search history.

(56) References Cited

U.S. PATENT DOCUMENTS

| | | | | |
|---|---|---|---|---|
| 2,424,436 A | * | 7/1947 | Crater ........................... | 285/408 |
| 2,853,105 A | * | 9/1958 | Brown .......................... | 141/285 |
| 3,249,685 A | * | 5/1966 | Heflin, Jr. ..................... | 277/607 |
| 3,464,721 A | * | 9/1969 | Surko, Jr. ................. | 285/148.17 |
| 3,558,164 A | * | 1/1971 | Havell ......................... | 285/236 |
| 3,680,896 A | * | 8/1972 | Cupit ....................... | 285/148.23 |
| 3,985,702 A | * | 10/1976 | Himes ........................... | 523/167 |
| 4,520,952 A | * | 6/1985 | Wahl et al. .................... | 222/199 |
| 4,850,615 A | * | 7/1989 | Giametta ........................ | 285/12 |
| 4,937,429 A | * | 6/1990 | Hollander ..................... | 219/204 |
| 6,364,373 B1 | | 4/2002 | Brockway | |
| 6,394,505 B1 | * | 5/2002 | Schmucki et al. ........ | 285/148.26 |
| 6,653,377 B1 | * | 11/2003 | Lloyd et al. ................... | 524/221 |
| 2007/0251599 A1 | | 11/2007 | Denk et al. | |

FOREIGN PATENT DOCUMENTS

DE         198 06 932 C2     3/2001
WO    WO 2010/052489     5/2010

OTHER PUBLICATIONS

International Search Report Dated Jun. 7, 2010.

\* cited by examiner

*Primary Examiner* — Anthony Stashick
*Assistant Examiner* — Kaushikkumar Desai
(74) *Attorney, Agent, or Firm* — Novak Druce Connolly Bove + Quigg LLP

(57) ABSTRACT

A system for attaching a thin film sleeve to a drum using a flange made of thermoplastic material. The inner surface of the flange having an integrally molded portion, where the integrally molded portion is used to create a seal with a different thermoplastic material. The second thermoplastic material can be attached to the drum, thereby forming a seal between the drum, the second thermoplastic material, and the flange. The outer surface of the flange being integrally sealed with the thin film sleeve, thereby creating a barrier between any product being transported through the sleeve to the drum.

7 Claims, 7 Drawing Sheets

O-RING

HALF O-RING

SQUARE

LIP SEAL

TRIANGLE

THERMOPLASTIC ELASTOMERIC ATTACHMENT SYSTEM FOR TRANSFER OF PARTICULATE MATERIALS

CROSS-REFERENCE TO RELATED APPLICATIONS

The present application claims priority from U.S. Provisional Application Ser. No. 61/163,536, filed Mar. 26, 2009, entitled "Thermoplastic Elastomeric Attachment System for Transfer of Particulate Materials," the contents of which are herein incorporated by reference in their entirety.

BACKGROUND

Several types of Flexible Containment Structures including Flexible Intermediate Bulk Containers (FIBCs), Flexible Enclosures, Flexible Transfer Sleeves, Flexible Glove Bags and Flexible Isolators are used in the containment and processing of particulate material. These devices are used to contain the particulate materials during the development through production and transfer operations when producing toxic powder products. The purpose is to prevent exposure of the toxic powder to workers and to prevent contamination of the particulate material from the exterior environment. The Flexible Containment Structures are connected to processing equipment; they contain process equipment and connect to storage devices including metal drums, fiber drums and intermediate bulk containers. There are several types of mechanical docking interfaces that are integral to the processing equipment or attached to the processing equipment that accommodate the attachment of these Flexible Containment Structures. These include Multiple O-Ring Canisters, straight walled rigid tubes, rigid rings, tubes and rings that have a raised feature at one end or tubes and rings that have feature along the exterior wall and also pan bases for open bottom enclosure applications.

Connections to mechanical docking interfaces of the process equipment are accomplished by pulling a tube of thin film over the mechanical docking interface and applying a compression member to the exterior film surface to complete a seal between the film and the mechanical docking interface surface. The purpose is to make a good seal between the Flexible Containment Structure and the mechanical docking interface. Compression member designs include bungee cord, O-Ring, rubber band, adhesive tape, mechanical clamp, wire tie or other similar device.

A short coming of this type of connection is that it does not completely seal the thin film to the mechanical docking interface. Small wrinkles are induced in the Flexible Containment Structure/mechanical docking interface connection when installed. The cause of the wrinkles is that the film diameter of the Flexible Containment Structure connection is larger than the processing equipment it is attached to so that the nearly inelastic film structure can be easily pulled over the mechanical docking interface. The goal is to join nearly inextensible materials to rigid components and create a leak tight seal. When the compression member is applied to the exterior of the Flexible Containment Structure the diameter of the Flexible Containment Structure is reduced, small wrinkles form resulting in a number of channels between the inside Flexible Containment Structure surface and the mechanical docking interface surface. These channels are areas where small particles of powder or contaminates can migrate through creating a breach in containment.

Examples of such connections can be found in: System for the Contained Transfer of Particulates U.S. Pat. No. 6,653,377; Method of the Contained Transfer of Particulates EP 1 721 829 B1, Method of the Contained Transfer of Particulates EP 1 728 717 B1

SUMMARY

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

The present disclosure is directed to a Thermoplastic Elastomeric Attachment System. More specifically, the present disclosure is directed to an attachment system that is used between a flexible containment structure and a storage drum. The attachment system primarily uses an annular thermoplastic material that has both inner and outer surfaces. The inner surface is molded so that a docking mechanism can receive the molded portion. This inner surface then forms a seal with the docking mechanism, thereby preventing any outside contamination. The outer surface of the annular thermoplastic material is integrated with the flexible containment structure to provide a sealed interface between the two structures. The docking mechanism is typically attached to a drum. Therefore, the present system allows for the transportation of products between a flexible containment structure and a drum without outside contamination.

BRIEF DESCRIPTION OF THE DRAWINGS

To describe the manner in which the above-recited and other advantages and features of the invention can be obtained, a more particular description of the invention briefly described above will be rendered by reference to specific embodiments thereof which are illustrated in the appended drawings. Understanding that these drawings depict only exemplary embodiments of the invention and are not therefore to be considered to be limiting of its scope, the invention will be described and explained with additional specificity and detail through the use of the accompanying drawings in which.

DETAILED DESCRIPTION

Figure 1:
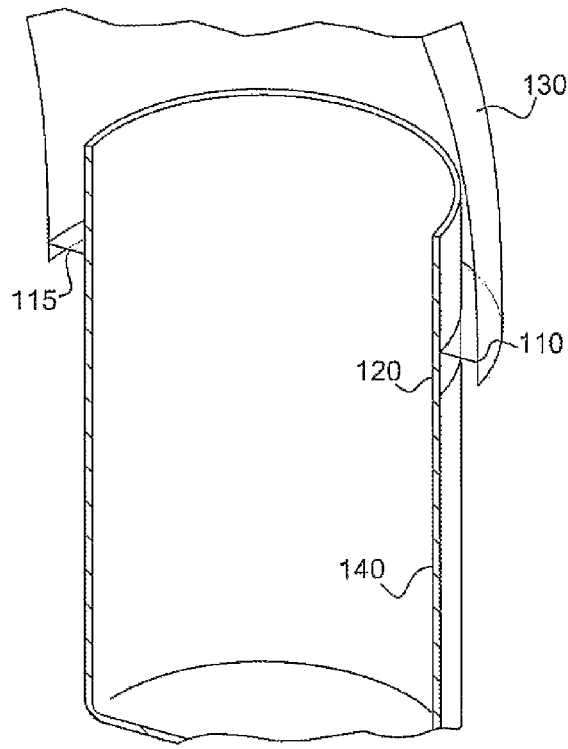
FIG. 1 illustrates a cross-sectional view of a first embodiment of the present disclosure.

The present disclosure is directed to a Thermoplastic Elastomeric Attachment System. The Thermoplastic Elastomeric Attachment is heat sealed to the end of the thin film sleeve that is integral to the Flexible Containment Structure or heat sealed to a flat panel wall of the Flexible Containment Structure. The Thermoplastic Elastomeric Assembly is stretched and pulled over a rigid mechanical docking device. The Thermoplastic Elastomeric Attachment system is produced in a smaller diameter than the rigid mechanical docking interface. The result is a conformal seal between the Thermoplastic Elastomeric Attachment and the rigid mechanical docking interface. A mechanical clamp, adhesive tape, O-Ring or similar device can be applied to the exterior surface of the Thermoplastic Elastomeric Attachment system to provide more compression to the seal area to provide a more leak tight and more structural seal. The clamping force prevents the Thermoplastic Elastomeric Attachment System from moving during processing and transfer operations of the particulate material.

The Thermoplastic Elastomeric Attachment Assembly can be manufactured by injection molding, compression molding, cut from an extruded flat sheet or by other similar processing methods. The molded parts can have a flat contour or can have an integral molded O-Ring for use in Multiple O-Ring canisters and Multiple O-Ring rings.

The Thermoplastic Elastomeric Attachment Assemblies are manufactured from a thermoplastic material that are directly heat sealed or bonded to polyolefin films that are typically used for these applications. The advantage of having the Thermoplastic Elastomeric Attachment System directly heat sealed or bonded to the Flexible Containment Structure is that it eliminates potential leak paths in connection. Typical elastomeric compounds like butyl, nitrile rubber, silicone rubber, natural rubber and similar materials are not able to be easily heat sealed or bonded to polyolefin materials.

The overall result is a significantly improved seal between the Flexible Containment Structure and the mechanical docking interface. This results in much better containment to manufacturing and transfer operations of the particulate material.

Thermoplastic Elastomeric Attachment Assembly Material

TABLE # 1

| Typical Physical Properties | | |
|---|---|---|
| Property(test method ASTM D 412) | Units | Thermoplastic Elastomeric Attachment System Material |
| Ultimate Force | lbs | 2 to 200 |
| Ultimate Stress | psi | 200-6000 |

TABLE # 1-continued

| Typical Physical Properties | | |
|---|---|---|
| Property(test method ASTM D 412) | Units | Thermoplastic Elastomeric Attachment System Material |
| % Strain at peak load | % | 100-3000 |
| Durometer, Shore A | | 20-100 |

While not intending to be limited to any particular polymeric material, the Thermoplastic Elastomeric Attachment System can be a blend of various polyolefins like polyethylene (linear low density polyethylene, low density polyethylene, high density polyethylene, metallocene grade polyethylenes), polypropylene (random, atatic, syndiotactic and metallocene grades) and/or thermoplastic elastomers comprising copolymers like Ethylene Propylene Diene Monomer (EPDM), Styrene Ethylene Butadiene Styrene (SEBS), Styrene Butadiene Styrene (SBS), Styrene Ethylene Butadiene Styrene (SEEBS), Styrene Isoprene Styrene (SIS) and other similar polymers.

These polymers can exist as homo- or co-polymers or blends and be compounded in the presence other additives such as thermal stabilizers, compatibilizers, pigments, extenders, slip additives, flow enhancers, and the like.

Thus, while this disclosure exemplifies various polymeric materials, blends, and modifications which have the properties necessary for Thermoplastic Elastomeric Attachment Systems to be a component of Flexible Containment Structure Containment Systems, the foregoing disclosure is exemplary only and not limiting of the present invention, as other modifications and alternatives will become apparent to those skilled in the art to which the invention pertains upon reading this disclosure.

The following are a non-limiting set of embodiments that conform with the claims presented herein.

Figure 2:
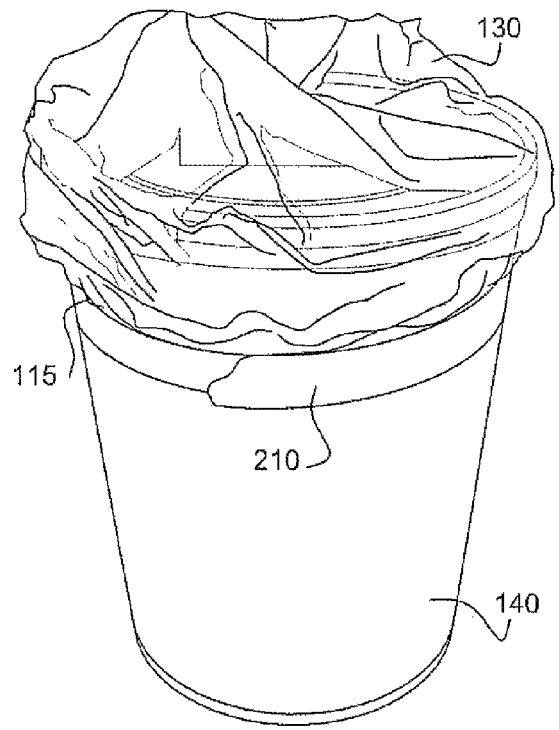
FIG. 2 illustrates a full view of the first embodiment of the present disclosure.

The first embodiment is presented in FIG. 1, a cross-sectional view of the first embodiment where a thin film sleeve is attached to a flange. The flange is then attached to drum. In FIG. 1, a flange, 115, is presented as one available embodiment of the annular thermoplastic material that has an inner and outer surface. The inner surface, 120, of attachment mechanism 115, is attached to the outer wall of the drum 140. The outer surface 110 is sealed to the flexible containment structure, represented herein by the flexible thin film sleeve, 130. Furthermore, in the embodiment represented by FIG. 1, the flange orients the outer surface of the annular thermoplastic material perpendicular to the inner surface of the annular thermoplastic material. FIG. 2 shows a similar embodiment to that shown in FIG. 1; however, this is a full view of the embodiment, rather than a cross-section. Furthermore, an adhesive tape, 210 is shown that further seals the flexible containment structure to the drum 140. Specifically, the thin film sleeve, 130, is attached to the drum 140, via that attachment mechanism 115, of which only outer surface 110 is visible. However, the inner surface, 120 (not shown) creates a seal with the outer wall of the drum, 140.

Figure 3:
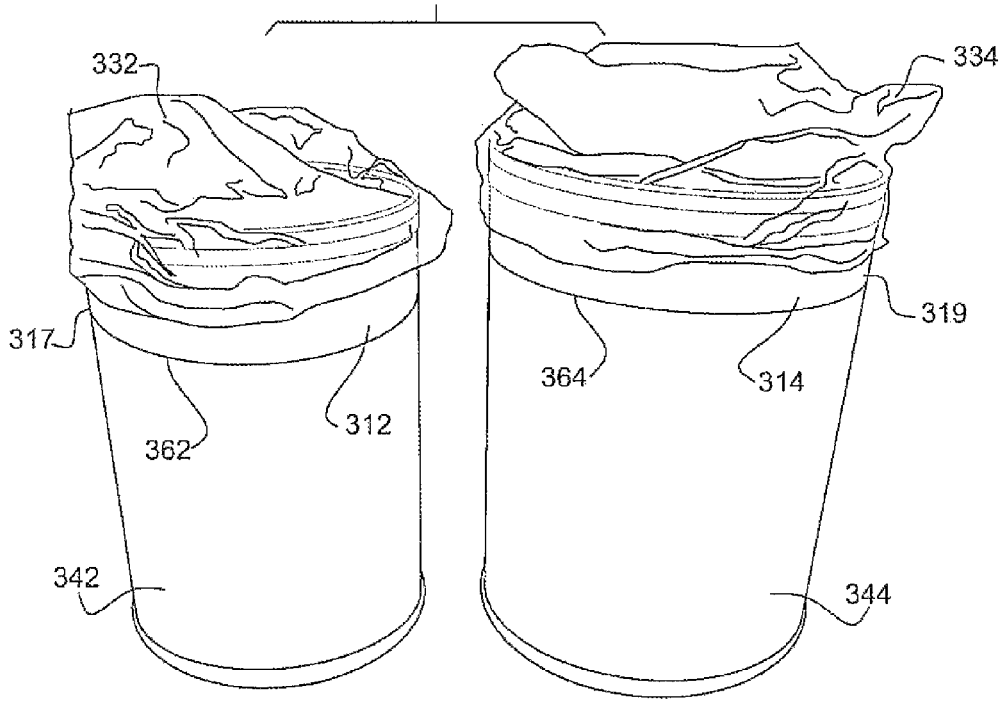
FIG. 3 illustrates a side by side view of different applications of the first embodiment of the present disclosure.

FIG. 3 shows further properties exhibited by the attachment system of the embodiments in FIGS. 1 and 2, in this case a exhibiting the elastic properties of the materials used in attachment mechanism, 115. Specifically, the thin film sleeve, 130 and the thermoplastic elastomeric attachment system can clearly be used across a variety of drums with at variety of diameters. As shown in FIG. 3, drum 342 has a smaller diameter than drum 344. However, the attachment mechanism, 115 works in both cases. Here, for drum 342, attachment mechanism 317, still attaches thin film sleeve, 432 to the outer wall of drum 342 using a flange, of which only outer surface 312 is visible. For drum 344, attachment mechanism 319 seals thin film sleeve 334 to drum 344 even though it is a substantially larger diameter. In FIG. 3, further shows that an adhesive film is used to further seal the attachment mechanisms, here represented by adhesive film 362 on drum 342 and adhesive film 364 on drum 344. Therefore, attachment mechanism 115, is an elastomeric thermoplastic and as such can be used in a multitude of settings.

Figure 4:
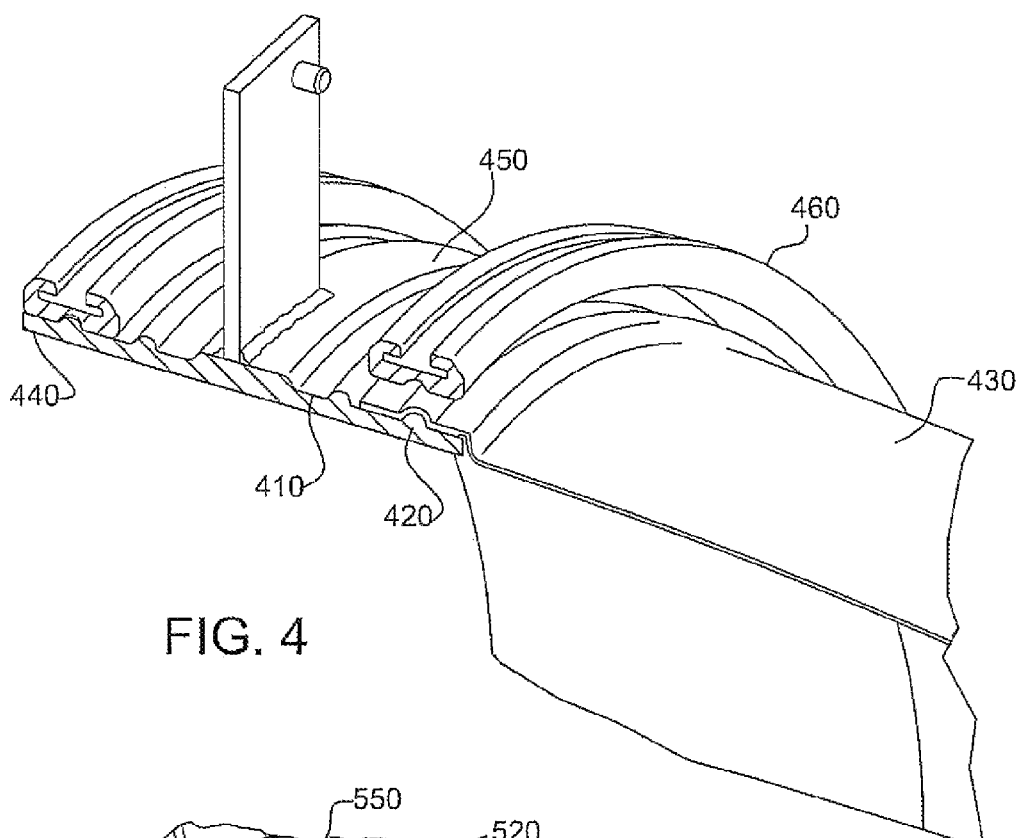
FIG. 4 illustrates a cross-sectional view of a second embodiment of the present disclosure.
Figure 5:
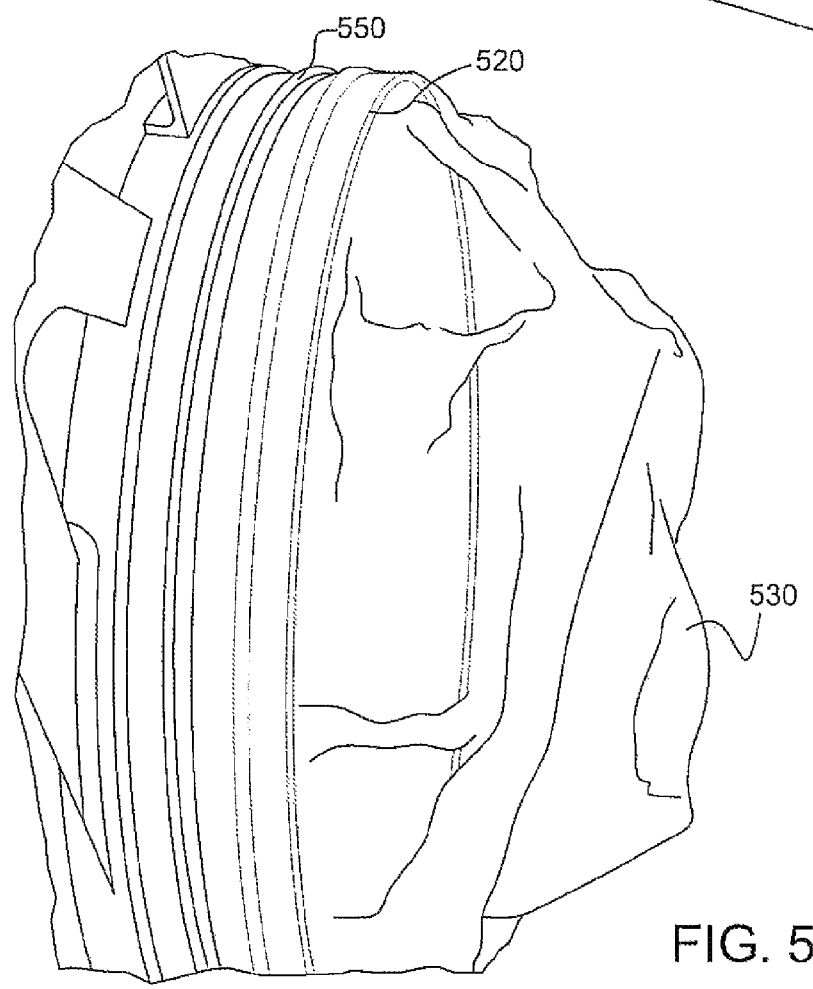
FIG. 5 illustrates a full view of the second embodiment of the present disclosure.

FIG. 4 shows a different embodiment than FIGS. 1-3, but still uses an annular thermoplastic material 410. In FIG. 4, the thin film sleeve, 430, is clamped to a stainless steel ring, 450, that has a raised bead ring, 420, onto which a steel band reinforced extrusion clamp is secured to provide a seal between the two objects. The stainless steel ring, 450, has multiple raised bead rings, 420 and 440, whereby a different seal can be made by raised bead ring 440, so that the stainless steel ring 450 can form a seal between two different objects. FIG. 5 shows a different view of the embodiment shown in FIG. 4. As shown in FIG. 5, then film sleeve, 530, is attached to the stainless steel bead ring 550, using thermoplastic elastomeric attachment system 520. The steel band reinforced extrusion claim is not shown in this figure for clarity.

Figure 6:
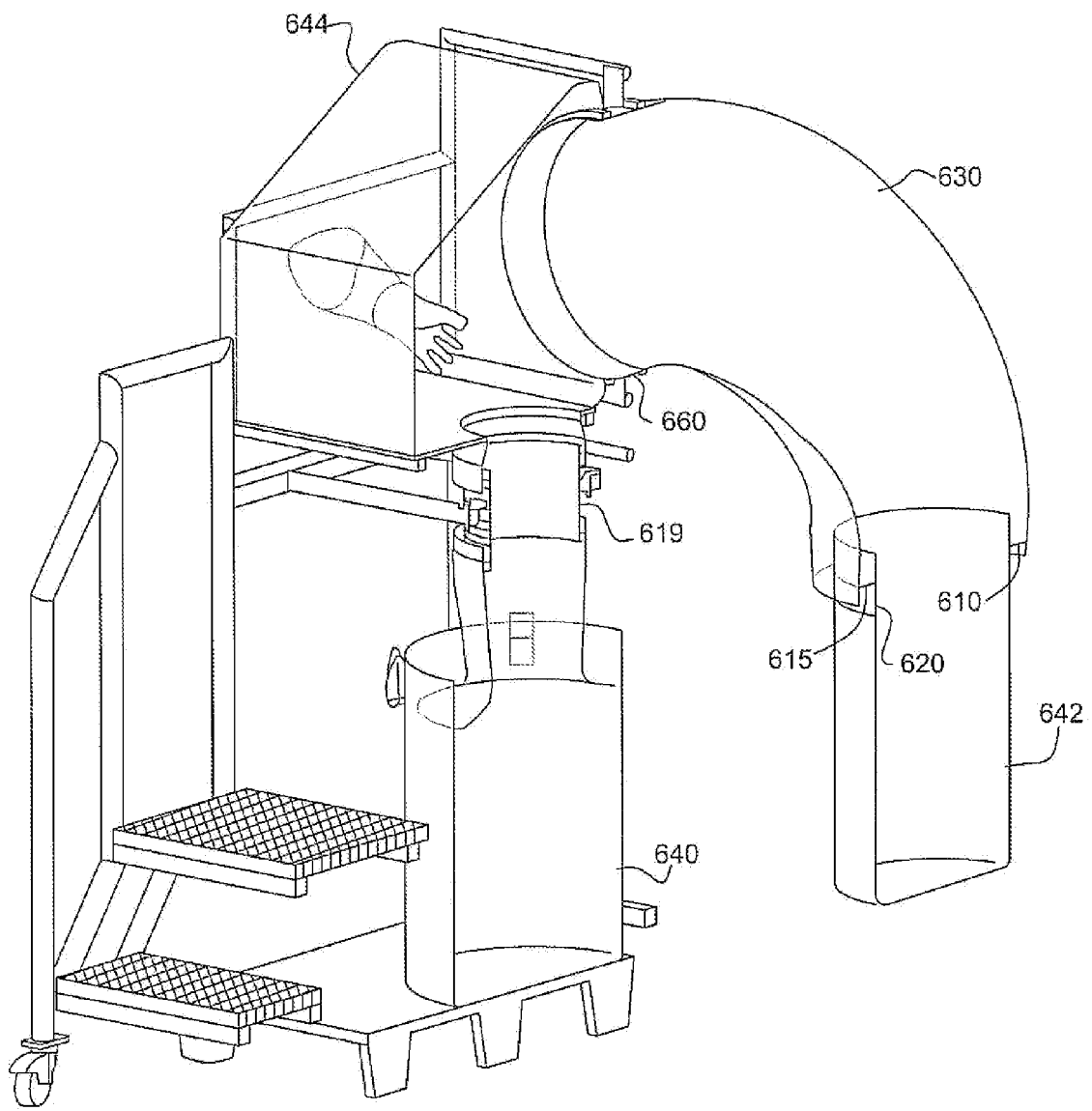
FIG. 6 illustrates a full system utilizing multiple embodiments of the present disclosure.

FIG. 6 shows multiple embodiments of the present disclosure working in concert in a single system. The embodiment shown in FIG. 1-3, is used in conjunction with drum 642 of FIG. 6. As shown in FIG. 6, drum 642, is sealed to inner surface 620, and inner surface 620 is oriented perpendicular to outer surface 610. Outer surface 610 is sealed to thin film sleeve 630. Thin film sleeve 630 is then sealed to a thin film enclosure, 644, via the embodiment shown in FIGS. 4 and 5. This is represented in FIG. 6, by the steel band reinforced extrusion clamp 660. Not visible are the thermoplastic elastomeric attachment system and the stainless steel raised bead ring that are covered by the extrusion clamp, 660. Finally, a different embodiment is shown in FIG. 6, herein identified as 619 which connects the thin film enclosure 644 to drum 640. This embodiment is described in detail below and shown in FIG. 7.

Figure 7:
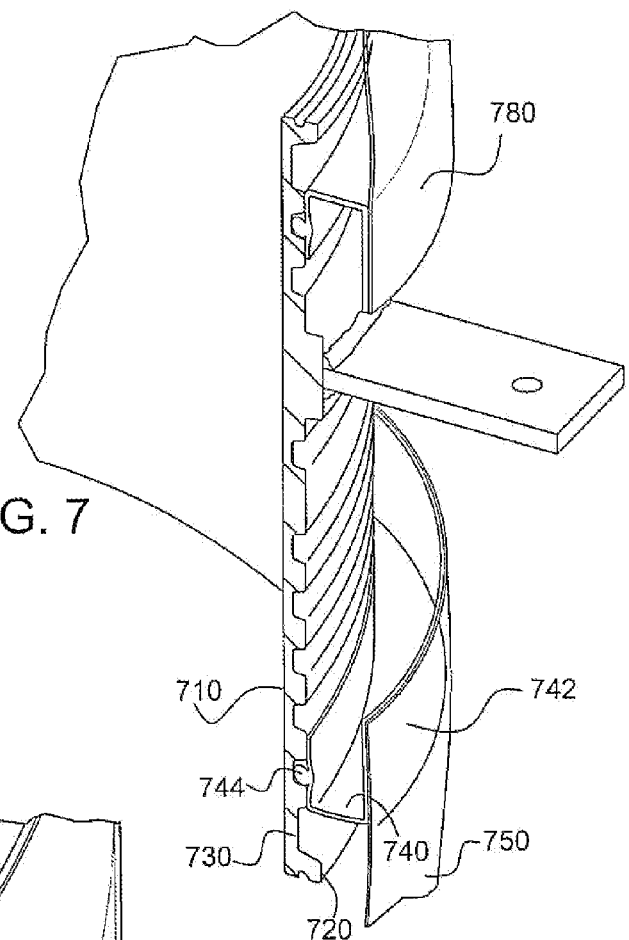
FIG. 7 illustrates a cross-sectional view of a third embodiment of the present disclosure.

FIG. 7 discloses a thermoplastic sleeve, 710, with a corrugated surface having ridges, 720, and grooves, 730 that are configured to receive the thermoplastic elastomeric attachment system 740. The attachment system 740, has an inside surface, 744, that has an integrally molded raised feature that is meant to fit within the grooves, 730. This raised feature, 744, on the inner surface, is meant to enhance the security and integrity of the seal formed between the thermoplastic sleeve 710 and the attachment system 740. Furthermore, the thin film sleeve, 750, is sealed to the outer surface, 742, of the attachment system. Also, as can be seen in FIG. 7, the thermoplastic sleeve, is corrugated about its entire surface, allowing the thermoplastic sleeve to be used with two separate attachment mechanisms. Attachment mechanism, 780, in this case is depicted as identical to attachment mechanism 740, however, that need not be the case. However, importantly, this does allow both attachment mechanisms to form proper seals with the thermoplastic sleeve, 710.

Figure 8:
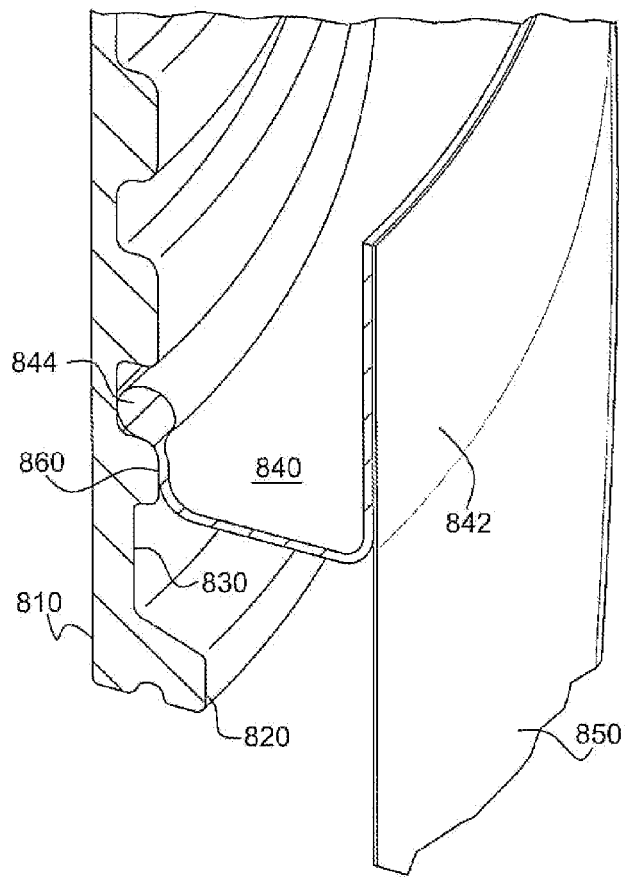
FIG. 8 illustrates a closer cross-sectional view of a third embodiment of the present disclosure.
Figure 9:
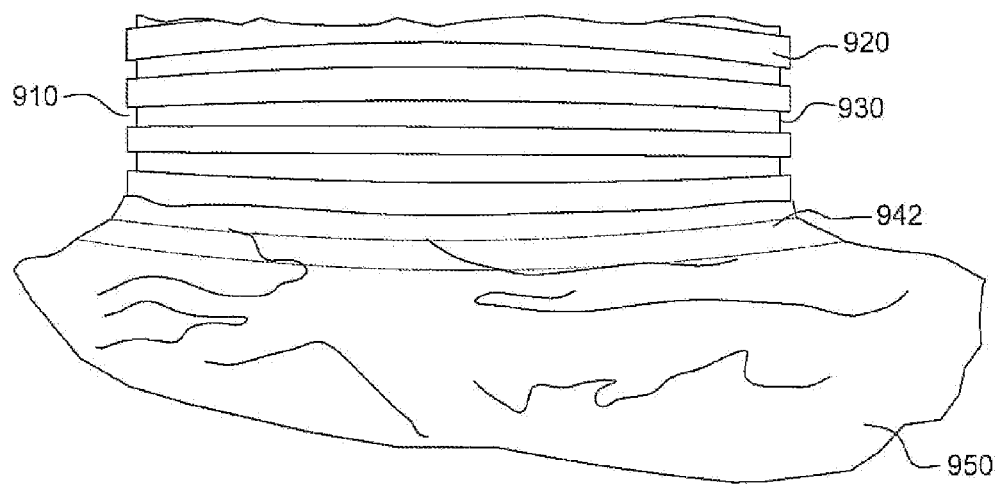
FIG. 9 illustrates a full view of a third embodiment of the present disclosure.
Figure 10:
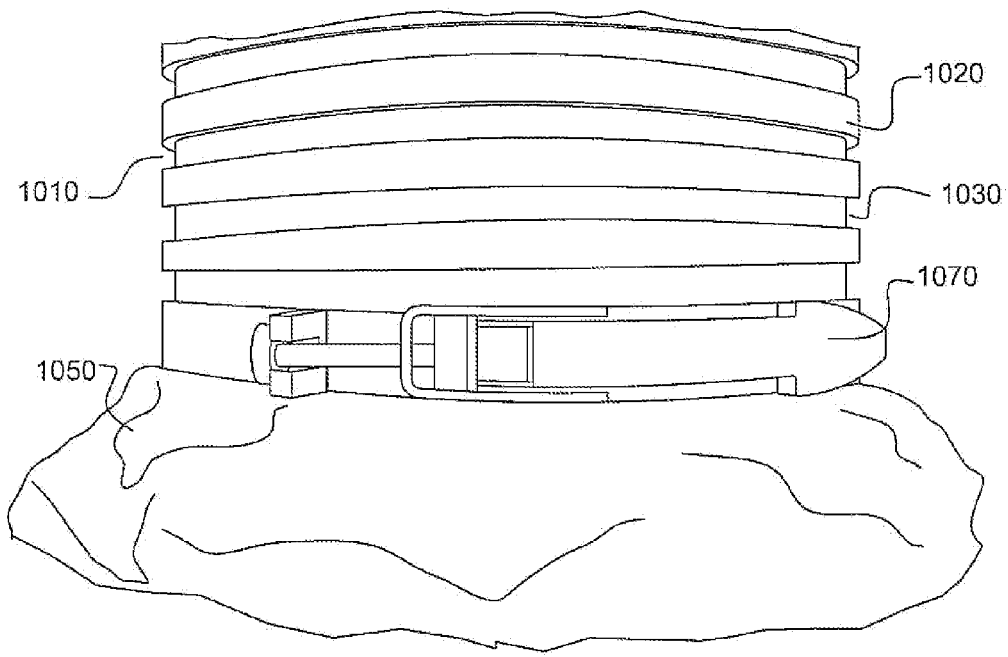
FIG. 10 illustrates a similar full view of a third embodiment but with a clamp added to further secure the seal.

FIG. 8 provides a closer view of the embodiment shown in FIG. 7. In FIG. 8, thermoplastic sleeve, 810, is attached to the attachment mechanism 840 via the molded raised feature 844 on the inner surface of the annular thermoplastic attachment system 840. Furthermore, as is shown in FIG. 8, the inner surface of the attachment system is in contact with the ridge 860 of the corrugated surface 820. This additional contact between the thermoplastic sleeve and inner surface of the attachment system provides a better seal with greater integrity. Also, the outer surface of the attachment mechanism, 842, is sealed to the thin film sleeve, 850, so that there is no contamination from the outside environment. Further illustrations of the embodiment shown in FIGS. 7 and 8, are depicted in FIGS. 9 and 10. In FIG. 9, thermoplastic sleeve, 910, has ridges, 920, and grooves, 930, which contact the attachment mechanism, 942, to form an appropriate seal. The only visible section of the attachment mechanism is the outer-surface, 942, that is sealing the thin film sleeve, 950, to the thermoplastic sleeve, 910. FIG. 10, shows a similar embodiment with ridges, 1020, and grooves, 1030, in thermoplastic sleeve, 1010. Except in FIG. 10, the thermoplastic elastomeric attachment system is not visible because an over center clamp is used for added security of the seal. However, thin film sleeve, 1050 is still sealed to thermoplastic sleeve 1010 via the attachment mechanism, not shown, because it is covered by the clamp.

Figure 11:
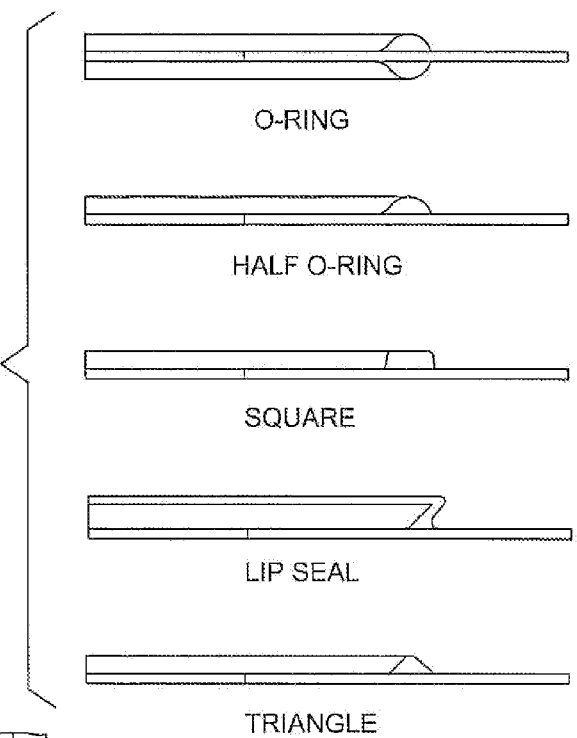
FIG. 11 illustrates different profiles that can be used with the integrally molded region.

As shown in the embodiment of FIGS. 7-10, the groove of the thermoplastic sleeve is configured to accept the molded region of the inner surface of the attachment mechanism. The raised portion of this integrally molded region can be molded to fit substantially any shape that would allow for a proper seal to form with the thermoplastic sleeve. A non-limiting list of profiles that can be used as the raised portion are shown in FIG. 11. At least the O-ring, Half O-ring, Square, lip seal, and triangle profiles can be used with the annular thermoplastic material, used as a flange in some embodiments of this disclosure. The flange may also use these profiles in combination, multiply, or on one or both sides of the flange. The design may also use co-molding materials to produce unique properties and features.

Figure 12:
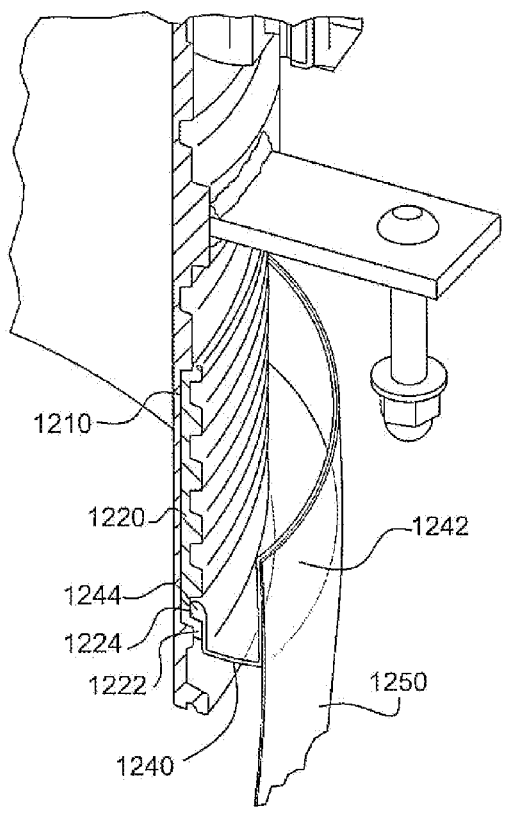
FIG. 12 illustrates a cross-sectional view of a fourth embodiment of the present disclosure.

FIG. 12, shows a further embodiment of the present disclosure, while similar to those embodiments shown in FIGS. 7-10 there are important differences. Initially, the thermoplastic elastomeric sleeve, 1220 is installed on a smooth walled canister 1210. This allows for the corrugated thermoplastic elastomeric sleeve to be removed and replaced if or when all the grooves, 1224, and ridges, 1222, have been worn or broken. However, this still allows for the integral molded raised portion, 1244, to be received into the groove of the thermoplastic elastomeric sleeve, 1220. Also, the thin film sleeve 1250 is still sealed to the outer surface, 1242, of the attachment mechanism 1240, and the inner surface, 1244, is substantially perpendicular to the outer surface 1242. Furthermore, there is still contact between at last one ridge and the inner surface, to increase the effectiveness of the seal.

Figure 13:
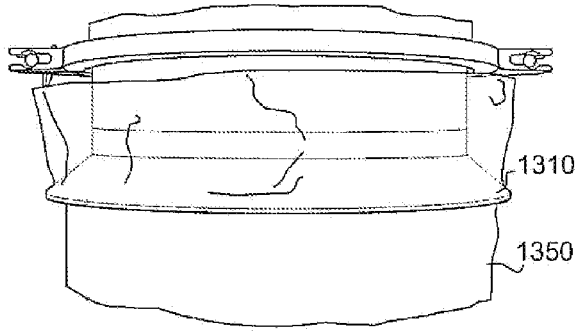
FIG. 13 illustrates a full view of a fifth embodiment of the present disclosure.

FIG. 13 shows a thin film sleeve, 1350, being prepared for attachment to a stainless steel canister, 1310, that is of a greater diameter than the thin film sleeve.

Figure 14:
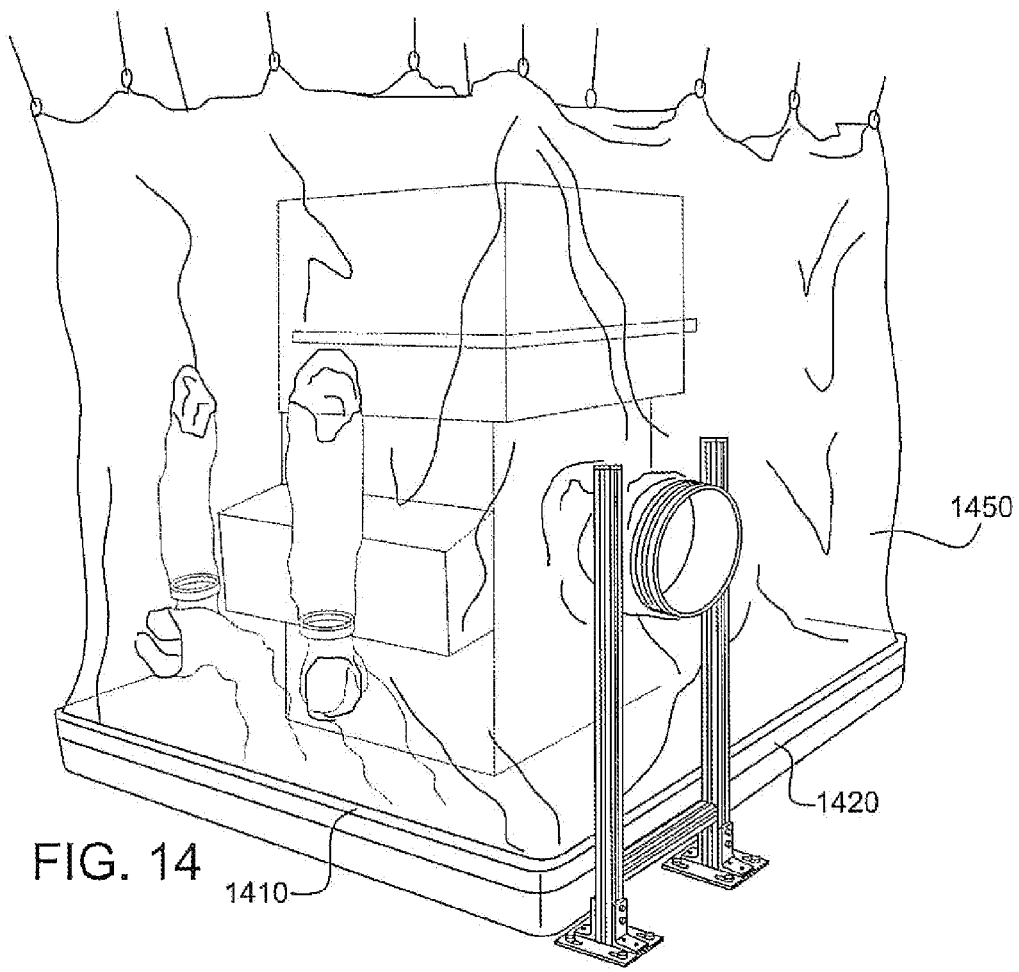
FIG. 14 illustrates a full view of enclosing an entire system using a sixth embodiment of the present disclosure.
Figure 15:
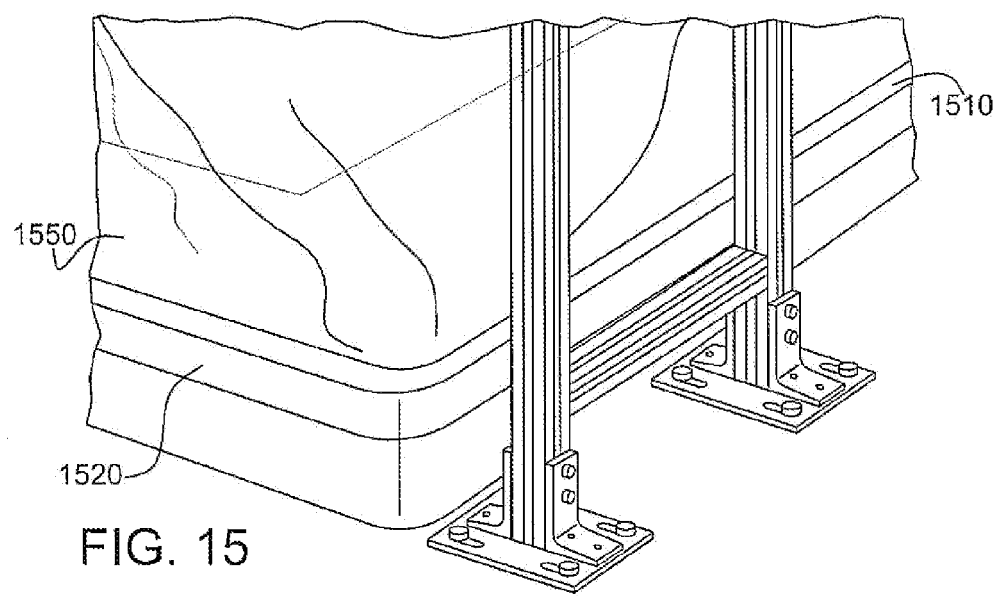
FIG. 15 illustrates a closer view of the sixth embodiment of the present disclosure.

FIG. 14 shows the thin film sleeve being used to encase an entire system, whereby the thermoplastic elastomeric attachment system is used on the bottom lip of the system enclosure. The only visible portion of the elastomeric attachment mechanism is the outer surface, 1410, that is being used to attach the thin film sleeve, 1450, to the thermoplastic base, 1420. FIG. 15, shows a closer view of just the thermoplastic base, 1510, wherein the thin film sleeve, is attached to the thermoplastic base, using the thermoplastic elastomeric attachment mechanism 1520. However, the inner surface of the attachment mechanism, 1520, is not visible. Also visible is an extrusion lock, 1540, used to further increase the integrity of the seal.

What is claimed is:

1. An attachment system for use between a charging device and a drum utilizing a flexible containment structure comprising:

a rigid mechanical docking surface, the rigid mechanical docking surface being mounted on the charging device and having an outer periphery;

a docking interface comprised of a first elastomeric, thermoplastic material; said docking interface comprising an inner circumferential surface and an outer circumferential surface;

the inner circumferential surface further comprising a molded edge; the molded edge comprising an integrally molded raised portion;

the outer circumferential surface being oriented perpendicular to the inner circumferential surface and being configured to integrally connect to a second thermoplastic material;

the second thermoplastic material comprising a flexible containment structure in the form of an inextensible thin film sleeve having an inner periphery greater than the outer periphery of the rigid mechanical docking surface, the thin film sleeve being in sealed engagement with the outer circumferential surface of the annular thermoplastic material, said sealed engagement being one selected from the group consisting of direct heat seal and bonding;

the rigid mechanical docking interface further comprising a corrugated surface, wherein the corrugated surface contains at least one ridge and at least one groove and wherein the corrugated surface is configured to form a removable seal with the inner circumferential surface of the docking interface, where the integrally molded raised portion of the docking interface is in removable contact with one of the at least one groove, and one of the at least one ridge is in contact with the inner circumferential surface of the docking interface.

2. The attachment system of claim 1, wherein the integrally molded raised portion has a profile that is selected from the group consisting of O-ring, Half O-ring, square, lip seal, and triangle.

3. The attachment system of claim 1, wherein the annular thermoplastic material is compounded with at least one additive selected from the group consisting of thermal stabilizers, compatibilizers, pigments, extenders, slip additives, and flow enhancers.

4. The attachment system of claim 1, wherein the integrally molded raised portion has a profile comprising an O-Ring.

5. The attachment system of claim 3, wherein the second thermoplastic material comprises a polyolefin film.

6. The attachment system of claim 1, wherein the second thermoplastic material is heat sealed to the outer circumferential surface of the annular thermoplastic material.

7. The attachment system of claim 1, wherein the second thermoplastic material is sealed to the outer circumferential surface of the annular thermoplastic material by bonding.

* * * * *